(12) United States Patent
Miyoshi

(10) Patent No.: US 11,834,109 B2
(45) Date of Patent: Dec. 5, 2023

(54) ELECTRIC POWER STEERING DEVICE

(71) Applicant: HONDA MOTOR CO., LTD., Tokyo (JP)

(72) Inventor: Takashi Miyoshi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 210 days.

(21) Appl. No.: 17/482,632

(22) Filed: Sep. 23, 2021

(65) Prior Publication Data
US 2022/0097756 A1 Mar. 31, 2022

(30) Foreign Application Priority Data

Sep. 25, 2020 (JP) .................................. 2020-160777
Mar. 22, 2021 (JP) .................................. 2021-047963

(51) Int. Cl.
*B62D 5/04* (2006.01)
*B62D 6/00* (2006.01)

(52) U.S. Cl.
CPC ........... *B62D 5/0463* (2013.01); *B62D 6/005* (2013.01)

(58) Field of Classification Search
CPC ...... B62D 5/0463; B62D 6/005; B62D 6/003; B62D 6/04; B62D 5/04; B62D 6/00
See application file for complete search history.

(56) References Cited

U.S. PATENT DOCUMENTS

| | | | | |
|---|---|---|---|---|
| 4,941,097 A | * | 7/1990 | Karnopp | ................ B62D 7/159 701/41 |
| 4,998,593 A | * | 3/1991 | Karnopp | ................ B62D 7/159 701/72 |
| 5,684,700 A | * | 11/1997 | Crocker | ................... B62D 6/00 701/41 |

(Continued)

FOREIGN PATENT DOCUMENTS

| | | | | |
|---|---|---|---|---|
| CN | 1491170 A | * | 4/2004 | ............... B62D 6/04 |
| CN | 1594004 A | * | 3/2005 | ............ B60T 8/1755 |

(Continued)

OTHER PUBLICATIONS

"Driver-vehicle closed-loop simulation of differential drive assist steering control system for motorized-wheel electric vehicle;" Wang et al. ; 2009 IEEE Vehicle Power and Propulsion Conference (pp. 564-571); Sep. 1, 2009. (Year: 2009).*

(Continued)

*Primary Examiner* — Khoi H Tran
*Assistant Examiner* — Jorge O Peche
(74) *Attorney, Agent, or Firm* — Rankin, Hill & Clark LLP

(57) ABSTRACT

An electric power steering device includes: an information obtaining unit that obtains information on a steering torque acting on a steering wheel of a vehicle, speed of the vehicle, a turn angle of the steering wheel, and an actual yaw rate; a setting unit that sets a steering assist control amount relating to an assist motor based a deviation of the actual yaw rate from a norm yaw rate set based on a traveling state of the (Continued)

vehicle; and a steering assist control unit that performs steering assist control using the assist motor based on the information on the steering torque. The steering assist control unit performs the steering assist control based on the steering assist control amount set by the setting unit.

6 Claims, 5 Drawing Sheets

(56) References Cited

U.S. PATENT DOCUMENTS

| | | | | |
|---|---|---|---|---|
| 6,405,113 | B1* | 6/2002 | Yamawaki | B62D 6/04 701/30.6 |
| 6,895,318 | B1* | 5/2005 | Barton | B60T 8/1755 701/41 |
| 7,739,001 | B2* | 6/2010 | Kato | B62D 6/003 180/443 |
| 7,938,026 | B2* | 5/2011 | Oniwa | G01L 5/221 73/862.333 |
| 8,125,175 | B2* | 2/2012 | Yoneda | B62D 5/046 318/400.15 |
| 8,584,533 | B2* | 11/2013 | Miyoshi | G01L 3/102 73/779 |
| 8,694,209 | B2* | 4/2014 | Tokimasa | B60W 10/20 701/79 |
| RE46,828 | E* | 5/2018 | Spillane | B60W 10/18 |
| 10,427,707 | B2* | 10/2019 | Miyoshi | B62D 5/0463 |
| 2002/0022915 | A1* | 2/2002 | Chen | B60T 8/1764 701/41 |
| 2002/0042671 | A1* | 4/2002 | Chen | B60T 8/1764 180/443 |
| 2003/0200016 | A1* | 10/2003 | Spillane | B60K 28/16 701/36 |
| 2004/0238265 | A1* | 12/2004 | Tsuchiya | B62D 5/0463 180/446 |
| 2005/0049769 | A1* | 3/2005 | Tsuchiya | B62D 6/002 701/41 |
| 2005/0209751 | A1* | 9/2005 | Kato | B62D 6/003 701/41 |
| 2005/0228564 | A1* | 10/2005 | Kato | B62D 6/008 701/91 |
| 2006/0064214 | A1 | 3/2006 | Takimoto et al. | |
| 2006/0208564 | A1* | 9/2006 | Yuda | B62D 6/04 303/146 |
| 2006/0225946 | A1 | 10/2006 | Yamazaki et al. | |
| 2007/0124051 | A1* | 5/2007 | Fujita | B60G 17/0162 701/70 |
| 2010/0094505 | A1* | 4/2010 | Kariatsumari | B62D 5/046 701/41 |
| 2010/0191423 | A1* | 7/2010 | Koyama | B60W 30/09 701/42 |
| 2010/0211269 | A1* | 8/2010 | Yasutake | B62D 6/003 701/42 |
| 2010/0211271 | A1* | 8/2010 | Yasutake | B60T 8/1755 701/48 |
| 2010/0228444 | A1* | 9/2010 | Kojo | B60W 30/18145 701/41 |
| 2010/0235049 | A1* | 9/2010 | Kariatsumari | B62D 5/046 318/609 |
| 2010/0252355 | A1* | 10/2010 | Yamazaki | B62D 5/0463 180/446 |
| 2011/0001441 | A1* | 1/2011 | Kariatsumari | H02P 21/0003 318/721 |
| 2011/0112724 | A1* | 5/2011 | Kariatsumari | B62D 5/046 701/41 |
| 2011/0118937 | A1* | 5/2011 | Kariatsumari | B62D 5/0496 701/41 |
| 2011/0118940 | A1* | 5/2011 | Kariatsumari | H02P 21/04 701/42 |
| 2016/0137195 | A1* | 5/2016 | Takahashi | B60W 40/114 701/41 |
| 2016/0152232 | A1* | 6/2016 | Takahashi | B62D 5/0463 701/41 |
| 2016/0303485 | A1* | 10/2016 | Kawamura | B62D 6/003 |
| 2016/0311416 | A1* | 10/2016 | Bretzigheimer | B60T 8/17558 |
| 2017/0210414 | A1* | 7/2017 | Sato | B62D 5/0463 |
| 2018/0022383 | A1* | 1/2018 | Kunihiro | B62D 6/005 701/41 |
| 2018/0086374 | A1* | 3/2018 | Sato | B62D 6/10 |
| 2018/0178802 | A1* | 6/2018 | Miyata | B60W 50/14 |
| 2018/0346026 | A1* | 12/2018 | Fujii | B62D 15/025 |
| 2019/0184978 | A1* | 6/2019 | Park | B60T 8/17558 |
| 2020/0047749 | A1* | 2/2020 | Morotomi | B60W 30/09 |
| 2022/0097756 | A1* | 3/2022 | Miyoshi | B62D 6/005 |

FOREIGN PATENT DOCUMENTS

| | | | | |
|---|---|---|---|---|
| CN | 101111417 B | * | 5/2011 | B60T 8/1755 |
| DE | 19951548 B4 | * | 11/2006 | B62D 5/0466 |
| DE | 102006019790 A1 | * | 10/2007 | B62D 5/0466 |
| DE | 112014002646 T5 | * | 2/2016 | B60K 28/14 |
| DE | 102010001868 B4 | * | 2/2023 | B60T 8/1755 |
| EP | 1354788 A1 | * | 10/2003 | B60T 8/1755 |
| EP | 1481872 A2 | * | 12/2004 | B62D 5/0463 |
| EP | 1510438 A2 | * | 3/2005 | B60T 8/1755 |
| EP | 1584544 A2 | * | 10/2005 | B62D 5/008 |
| EP | 1800995 A1 | * | 6/2007 | B62D 5/0472 |
| EP | 3608190 A1 | * | 2/2020 | B60W 30/09 |
| GB | 2539258 A | * | 12/2016 | B60C 23/00 |
| JP | H11-20728 A | | 1/1999 | |
| JP | 2003-175845 A | | 6/2003 | |
| JP | 2004532153 A | * | 10/2004 | |
| JP | 2005297719 A | * | 10/2005 | B62D 5/008 |
| JP | 2006-088813 A | | 4/2006 | |
| JP | 2006168649 A | * | 6/2006 | |
| JP | 2006-264392 A | | 10/2006 | |
| JP | 2008087672 A | * | 4/2008 | B62D 5/008 |
| JP | 4223457 B2 | * | 2/2009 | |
| JP | 2009-143452 A | | 7/2009 | |
| JP | 2010-095180 A | | 4/2010 | |
| JP | 2010-208592 A | | 9/2010 | |
| JP | 2010208592 A | * | 9/2010 | |
| JP | 2011183883 A | * | 9/2011 | |
| JP | 5588388 B2 | * | 9/2014 | B62D 6/003 |
| JP | 2015151048 A | * | 8/2015 | |
| KR | 20150141188 A | * | 12/2015 | |
| KR | 20170136765 A | * | 2/2017 | |
| KR | 20170082355 A | * | 7/2017 | |
| WO | WO-2006123215 A2 | * | 11/2006 | B60T 8/1755 |

OTHER PUBLICATIONS

"Electric power steering with Permanent magnet synchronous motor drive used in automotive application;" Shriwastava et al.; 2011 1st International Conference on Electrical Energy Systems (pp. 145-148); Jan. 1, 2011. (Year: 2011).*

"Simulation of Driving Force Power Steering Control System Based on AMESim and Simulink;" Jin et al.; 2010 International Conference on Intelligent Computation Technology and Automation (vol. 3, pp. 329-332); Sep. 3, 2010. (Year: 2010).*

Office Action received in corresponding Japanese application No. 2021-047963 dated Oct. 25, 2022 with English translation (6 pages).

* cited by examiner

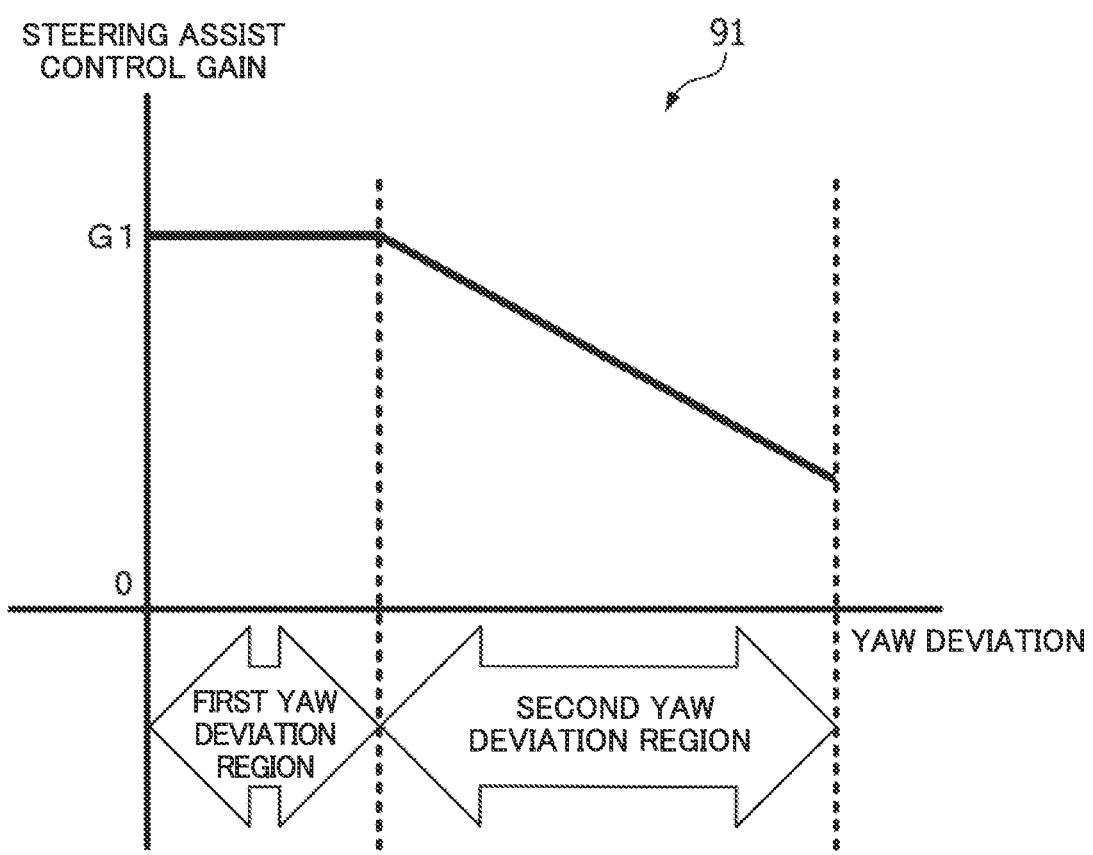

ELECTRIC POWER STEERING DEVICE

CROSS-REFERENCE TO RELATED APPLICATION

This application is based upon and claims priority from Japanese Patent Application No. 2020-160777, filed on Sep. 25, 2020, and Japanese Patent Application No. 2021-047963, filed on Mar. 22, 2021, the entire contents of which are incorporated herein by reference.

BACKGROUND OF THE INVENTION

1. Field of the Invention

The present invention relates to an electric power steering device including an assist motor that assists steering force required for a steering operation of a driver.

2. Description of the Related Art

An electric power steering device including an assist motor that assists steering force of a driver and a control device that performs drive control of the assist motor has been conventionally known (see Japanese Patent Application Publication No. 2010-95180).

In the electric power steering device according to Japanese Patent Application Publication No. 2010-95180, when a vehicle travels straight on a canted road that is a road tilted in the width direction of the vehicle, the control device corrects a steering assist torque provided by the assist motor such that the steering torque detected by the steering torque sensor becomes equal to or less than a target steering torque set in advance. This suppresses a steering-pull phenomenon in which the vehicle is affected by gravity and drifts toward the lower side in the tilt direction.

SUMMARY OF THE INVENTION

However, in the electric power steering device according to Japanese Patent Application Publication No. 2010-95180, for example, when the yaw rate is around zero (the traveling state of the vehicle is a state where the steering is kept substantially straight), the steering assist torque is corrected to be increased in an initial state of the steering-pull at which the steering torque starts to increase. Accordingly, there is a risk that the steering-pull phenomenon is rather encouraged.

The present invention has been made to solve the aforementioned problem and an object thereof is to provide an electric power steering device that can maintain excellent steering feel while suppressing a steering-pull phenomenon also in an initial state of the steering-pull at which the steering torque starts to increase when the yaw rate is around zero.

In order to achieve the aforementioned object, the main characteristic of the invention according (1) is an electric power steering device including: an information obtaining unit that obtains information on a steering torque acting on a steering member of a vehicle; and a control unit that performs steering assist control using an assist motor based on the information on the steering torque, wherein the information obtaining unit further obtains information on speed of the vehicle, a turn angle of the steering member, and an actual yaw rate, the electric power steering device further includes a setting unit that sets a steering assist control amount relating to the assist motor based a deviation of the actual yaw rate from a norm yaw rate set based on a traveling state of the vehicle, and the control unit performs the steering assist control based on the set steering assist control amount.

In the invention according to (1), since the setting unit sets the steering assist control amount relating to the assist motor based on the deviation of the actual yaw rate from the norm yaw rate set based on the traveling state of the vehicle and the control unit performs the steering assist control based on the set steering assist control amount, it is possible to maintain excellent steering feel while suppressing a steering-pull phenomenon also in an initial state of the steering-pull at which the steering torque starts to increase when the yaw rate is around zero.

According to the present invention, it is possible to maintain excellent steering feel while suppressing a steering-pull phenomenon also in an initial state of the steering-pull at which the steering torque starts to increase when the yaw rate is around zero.

BRIEF DESCRIPTION OF THE DRAWINGS

FIG. 3C is an explanatory diagram illustrating an example of a second gain map used in conversion of a yaw deviation to a steering assist control gain.

DETAILED DESCRIPTION OF THE EMBODIMENTS

Figure 1:
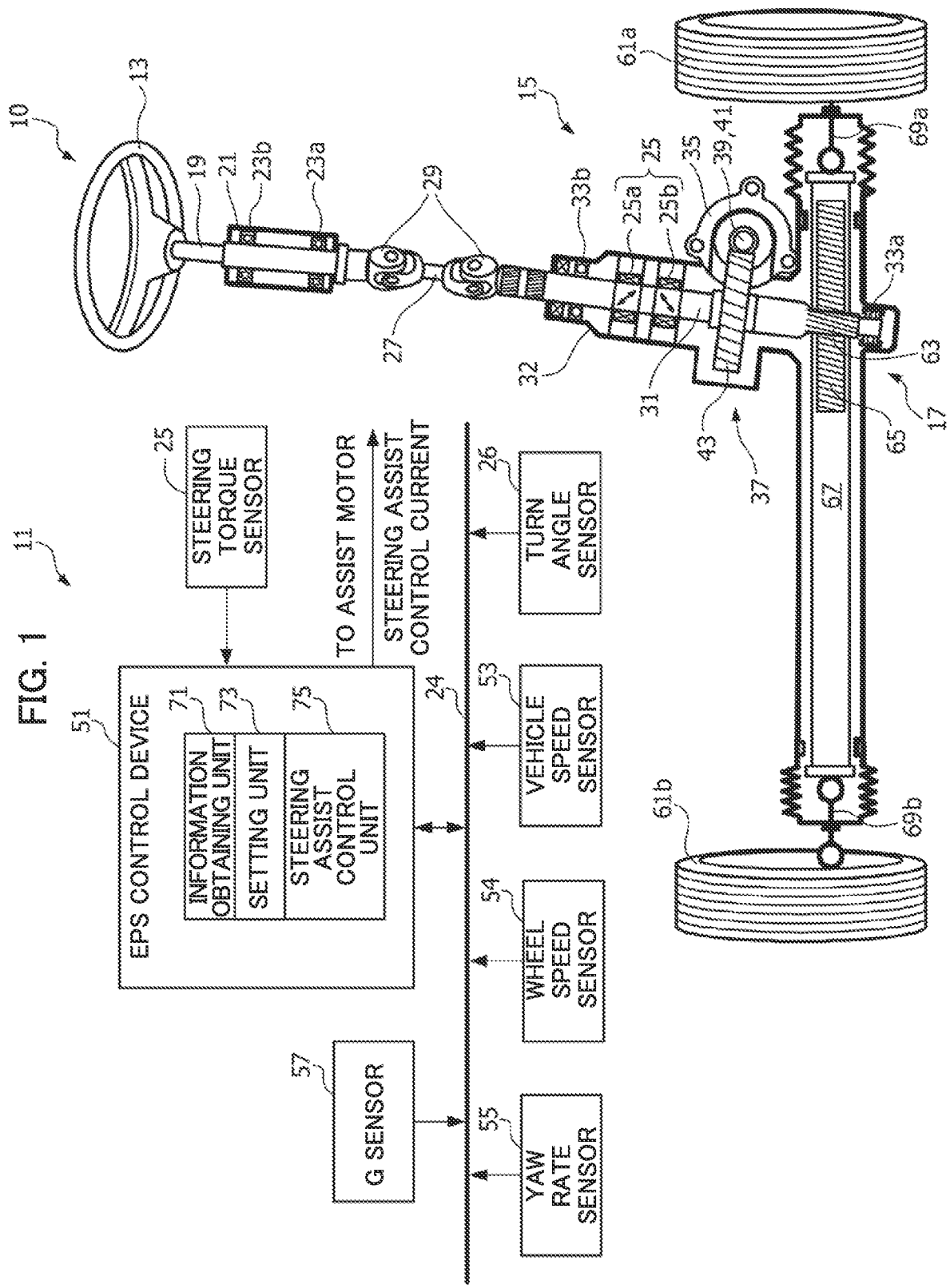
FIG. 1 is a schematic configuration diagram of an electric power steering device according to an embodiment of the present invention.

Electric power steering devices according to multiple embodiments of the present invention are described below in detail with reference to the drawings.

Note that, in the drawings described below, members having the same function or members having functions corresponding to one another are denoted by the same reference numeral in principle. Moreover, the sizes and shapes of the members are sometimes schematically illustrated in a deformed or exaggerated manner for the sake of convenience of description.

[Configuration of Steering Device 10 Linked to Electric Power Steering Device 11]

A configuration of a steering device 10 linked to an electric power steering device 11 according to the embodiment of the present invention is described with reference to FIG. 1 before description of the electric power steering device 11. FIG. 1 is a schematic configuration diagram of the electric power steering device 11 according to the embodiment of the present invention.

As illustrated in FIG. 1, the steering device 10 includes a steering wheel 13, a steering assist device 15, and a turn device 17.

The steering wheel 13 corresponding to a "steering member" of the present invention is a member operated by a driver when the driver intends to change a traveling direction of a vehicle (not illustrated) to a desired direction. One end portion of a steering shaft 19 is coupled to a center portion of the steering wheel 13. The steering shaft 19 is supported to be turnable relative to an upper casing 21 via a pair of bearings 23a and 23b provided respectively in upper and lower portions of the upper casing 21.

The steering shaft 19 is provided with a turning angle sensor 26 that detects a turn angle of the steering wheel 13. Turn angle information detected by the turn angle sensor 26 is supplied to an EPS control device 51 via a communication medium 24.

A turn shaft 31 is coupled to the other end portion of the steering shaft 19 via an intermediate shaft portion 27 and a pair of universal joints 29 in series, the turn shaft 31 located on the opposite side to the one end portion provided with the steering wheel 13. The turn shaft 31 is supported to be turnable relative to a lower casing 32 via a pair of bearings 33a and 33b provided respectively in lower and upper portions of the lower casing 32.

A magnetostrictive steering torque sensor 25 is provided inside the lower casing 32 to surround the turn shaft 31. For example, a magnetostrictive film (not illustrated) made of Ni—Fe plating is provided at a portion of the turn shaft 31 facing the steering torque sensor 25 to cover an entire periphery of the turn shaft 31 in the circumferential direction. The steering torque sensor 25 has a function of detecting a steering torque inputted into the turn shaft 31 via the steering wheel 13, the steering shaft 19, the intermediate shaft portion 27, and the pair of universal joints 29 without coming into contact with the turn shaft 31 by using, for example, solenoid type first and second coils 25a and 25b.

Principles of detection of the steering torque in the magnetostrictive steering torque sensor 25 are described. When the steering torque is inputted into the turn shaft 31, strain in a tension direction (+45° direction) and strain in a compression direction (−45° direction) are generated on a surface of the turn shaft 31. In this case, magnetic permeability increases in the tension direction while decreases in the compression direction. This phenomenon is referred to as "magnetostrictive effect". The first coil 25a is provided such that a magnetic flux flows in a direction in which the magnetic permeability increases. Meanwhile, the second coil 25b is provided such that a magnetic flux flows in a direction in which the magnetic permeability decreases.

Then, inductance increases in the first coil 25a provided such that the magnetic flux flows in the direction in which the magnetic permeability increases while decreases in the second coil 25b provided such that the magnetic flux flows in the direction in which the magnetic permeability decreases. The first coil 25a and the second coil 25b are connected by a bridge and a differential amplifier (not illustrated) amplifies and outputs a differential voltage. An output voltage (steering torque information) proportional to the steering torque can be thereby detected.

The steering torque information detected by the steering torque sensor 25 is supplied to the electronic power steering control device (hereinafter, abbreviated as "EPS control device" in some cases) 51 to be described later. Note that there may be employed a configuration in which the steering torque information is supplied to the EPS control device 51 via, for example, the communication medium 24 such as a controller area network (CAN).

The steering assist device 15 provided on the turn shaft 31 has a function of providing assist force for a manual operation of the steering wheel 13 by the driver. The steering assist device 15 includes a speed reduction mechanism 37 and an assist motor 35 that supplies the assist force (steering reaction force) for reducing the steering torque (including adjustment of steering response) of the steering wheel 13 in the manual operation by the driver.

The speed reduction mechanism 37 includes a worm gear 41 that is coupled to an output shaft portion 39 of the assist motor 35 and a worm wheel gear 43 that is in mesh with the worm gear 41. The worm wheel gear 43 is provided in an intermediate portion of the turn shaft 31 in an axial direction to be turnable integrally with the turn shaft 31. The speed reduction mechanism 37 is provided to be arranged between the turn shaft 31 and an output shaft portion 39 of the assist motor 35.

The worm wheel gear 43 thereby fulfills a role of transmitting the drive force of the assist motor 35 to the steering wheel 13 via the speed reduction mechanism 37, the turn shaft 31, the steering shaft 19, and the like and, at the same time, transmitting the drive force to turn wheels 61a and 61b via the turn device 17.

A resolver (not illustrated) that detects and outputs rotation angle information of the assist motor 35 is provided integrally with the assist motor 35. The rotation angle information of the assist motor 35 detected by the resolver is supplied to the EPS control device 51.

The turn device 17 has a function of transmitting a steering torque of the driver inputted via the steering wheel 13 and the steering shaft 19 to the turn wheels 61a and 61b. The turn device 17 includes a pinion gear 63 provided on the turn shaft 31, a rack shaft 67 having rack teeth 65 in mesh with the pinion gear 63 and capable of reciprocating in a vehicle width direction, tie rods 69a and 69b provided at both ends of the rack shaft 67, and the turn wheels 61a and 61b turnably provided respectively via the tie rods 69a and 69b.

[Configuration of Electric Power Steering Device 11]

Next, a configuration of the electric power steering device 11 according to the embodiment of the present invention is described with reference to FIG. 1.

As illustrated in FIG. 1, the electric power steering device 11 includes the steering assist device 15 and the EPS control device 51. The EPS control device 51 is connected to the communication medium 24. In addition to the aforementioned turn angle sensor 26, a vehicle speed sensor 53 that detects speed of the host vehicle (vehicle speed), a wheel speed sensor 54 that detects rotation speed of each wheel included in the host vehicle, a yaw rate sensor 55 that detects an actual yaw rate YRac of the host vehicle, and a G sensor 57 that detects deceleration in a front-rear direction and a horizontal direction of the host vehicle are connected to the communication medium 24.

(Internal Configuration of EPS Control Device 51)

Next, an internal configuration of the EPS control device 51 is described with reference to FIG. 1.

As illustrated in FIG. 1, the EPS control device 51 refers to various pieces of information such as the steering torque information detected by the steering torque sensor 25, the turn angle information detected by the turn angle sensor 26, and the vehicle speed information detected by the vehicle speed sensor 53 to calculate a value of a target current (for steering assist control) to be supplied to the assist motor 35. Moreover, the EPS control device 51 performs controls such that an actual value of a current flowing in the assist motor 35 follows the steering assist control current, and thereby reduces the steering torque necessary in the steering of the steering wheel 13 by the driver.

The EPS control device 51 includes a microcomputer that performs computation processing and various peripheral circuits including a drive control circuit of the assist motor 35.

As illustrated in FIG. 1, the EPS control device 51 includes an information obtaining unit 71, a setting unit 73, and a steering assist control unit 75 to implement the aforementioned functions.

The information obtaining unit 71 has a function of obtaining various pieces of information such as the steering torque information that is detected by the steering torque sensor 25 every moment, the turn angle information detected by the turn angle sensor 26, the vehicle speed information detected by the vehicle speed sensor 53, the wheel speed information detected by the wheel speed sensor 54, the actual yaw rate information detected by the yaw rate sensor 55, and the front-rear direction deceleration (front-rear G) information detected by the G sensor 57. Moreover, the information obtaining unit 71 obtains rotation information of the assist motor 35 (including both of the rotation angle information and the rotation speed information of the assist motor 35) detected by the resolver.

The setting unit 73 sets the steering assist control current (steering assist control amount) relating to the assist motor 35 based on a deviation YRdd of the actual yaw rate YRac from a norm yaw rate YRnm set based on a traveling state of the vehicle. Details of setting contents of the steering assist control current relating to the assist motor 35 in the setting unit 73 are to be described later.

The steering assist control unit 75 basically performs the steering assist control using the assist motor 35 based on the steering torque information. Moreover, the steering assist control unit 75 performs the steering assist control based on the steering assist control current (steering assist control amount) set by the setting unit 73. The steering assist control unit 75 corresponds to a "control unit" of the present invention.

(Configuration Focusing on Flow of Information Processing in EPS Control Device 51)

Figure 2:
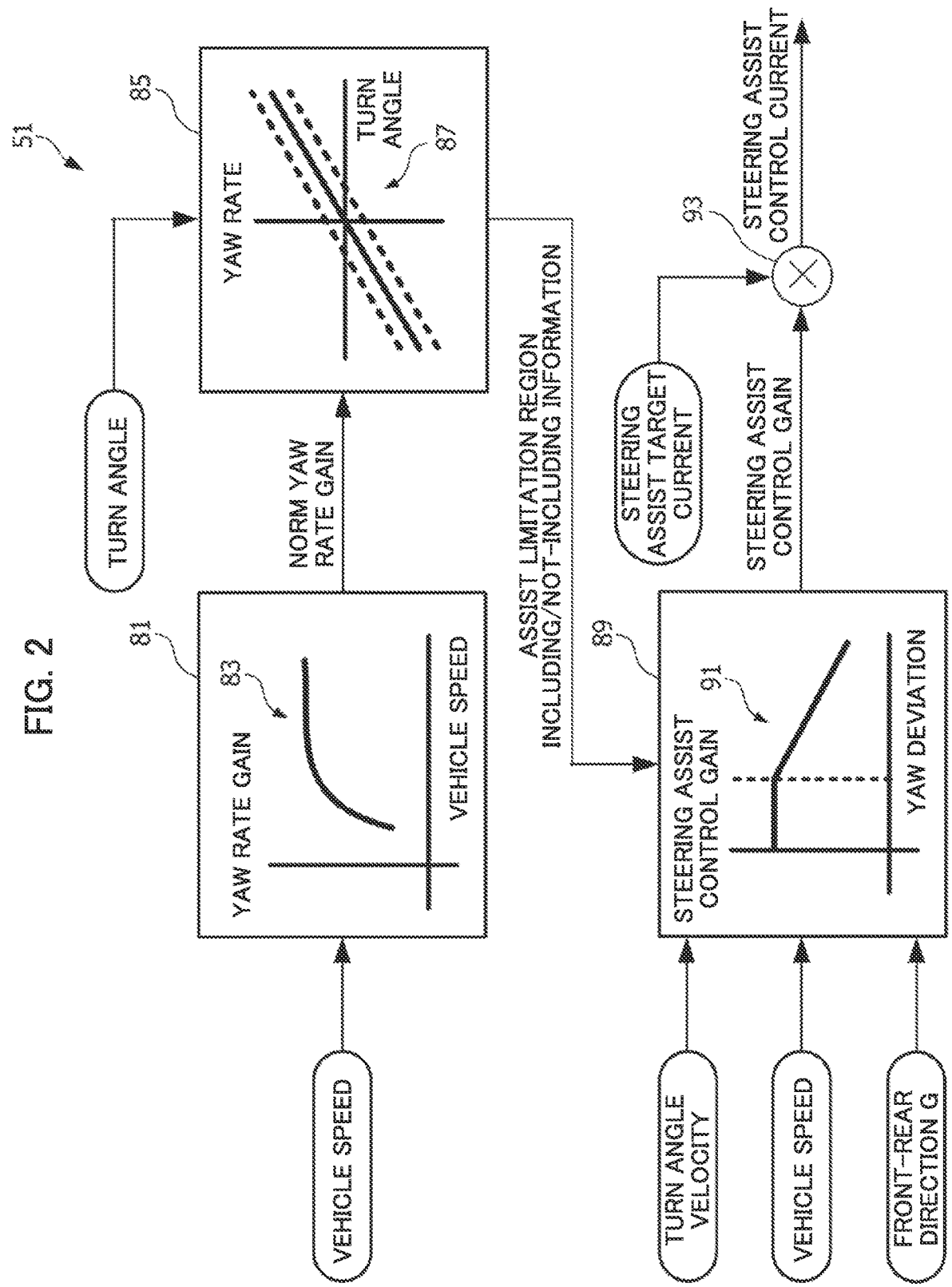
FIG. 2 is a block configuration diagram focusing on a flow of information processing in an EPS control device included in the electric power steering device.
Figure 3A:
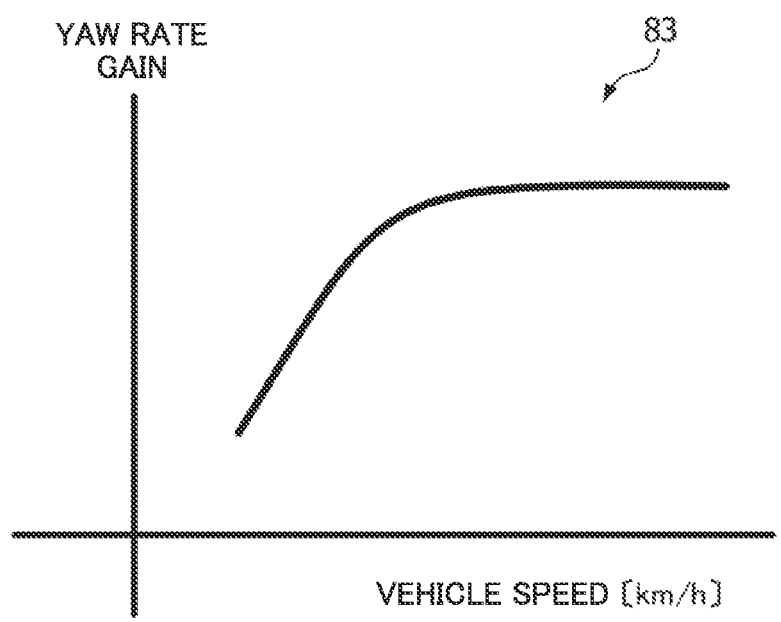
FIG. 3A is an explanatory diagram illustrating an example of a first gain map used in conversion of vehicle speed to a yaw rate gain.
Figure 3B:
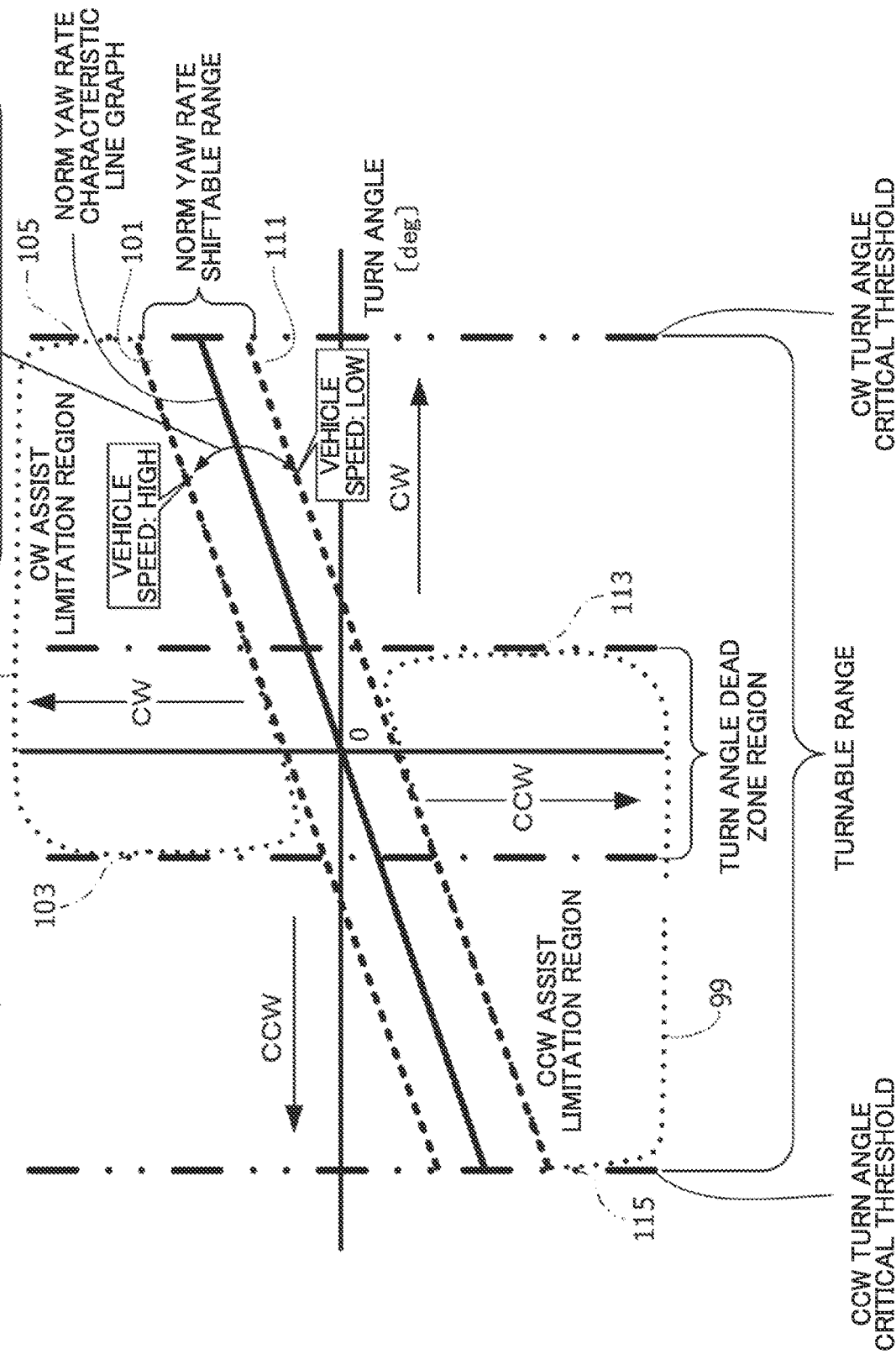
FIG. 3B is an explanatory diagram illustrating an example of a relationship characteristic of a yaw rate with respect to a change in turn angle.

Next, a configuration focusing on a flow of information processing in the EPS control device 51 is described with reference to FIGS. 2 and 3A to 3C. FIG. 2 is a block configuration diagram focusing on the flow of the information processing in the EPS control device 51. FIG. 3A is an explanatory diagram illustrating an example of a first gain map 83 used in conversion of the vehicle speed to a yaw rate gain. FIG. 3B is an explanatory diagram illustrating an example of an assist limitation region map 87 used in determination of whether assist limitation is necessary or not for each of multiple regions present on a turn angle-yaw rate relationship line graph. FIG. 3C is an explanatory diagram illustrating an example of a second gain map 91 used in conversion of the yaw deviation to the steering assist control gain.

As illustrated in FIG. 2, the EPS control device 51 includes a norm yaw rate gain calculation unit 81, an assist limitation determination unit 85, a steering assist control gain calculation unit 89, and a multiplication unit 93.

The norm yaw rate gain calculation unit 81 includes the first gain map 83 illustrated in FIG. 3A. As illustrated in FIG. 3A, the first gain map 83 describes relationship characteristic information of the yaw rate gain corresponding to changes in the vehicle speed. The norm yaw rate gain calculation unit 81 refers to the first gain map 83 and converts the vehicle speed detected by the vehicle speed sensor 53 to the yaw rate gain.

The yaw rate gain obtained by the norm yaw rate gain calculation unit 81 is sent to the assist limitation determination unit 85 as the norm yaw rate gain.

The assist limitation determination unit 85 includes the assist limitation region map 87 illustrated in FIG. 3B. As illustrated in FIG. 3B, in the assist limitation region map 87, attribute information, relating to necessity of the assist limitation for multiple regions defined on a turn angle-yaw rate matrix whose horizontal axis represents the turn angle and whose vertical axis represents the yaw rate, are described in association with each region.

In the turn angle-yaw rate matrix of the assist limitation region map 87 illustrated in FIG. 3B, the turn angle in the horizontal axis (turn angle axis) is illustrated such that an area to the right of the original point (neutral position) in the drawing describes a clockwise (hereinafter, "clockwise" is sometimes abbreviated as "CW") direction and an area to the left of the original point describes a counterclockwise (hereinafter, "counterclockwise" is sometimes abbreviated as "CCW") direction. Specifically, it is assumed that a turn angle in the CW direction takes a positive value while a turn angle in the CCW direction takes a negative value.

Moreover, in the turn angle-yaw rate matrix of the assist limitation region map 87 illustrated in FIG. 3B, the yaw rate in the vertical axis (yaw rate axis) is illustrated such that an area above the original point 0 in the drawing describes the CW direction and an area below the original point 0 describes the CCW direction. Specifically, it is assume that a yaw rate in the CW direction takes a positive value while a yaw rate in the CCW direction takes a negative value.

As illustrated in FIG. 3B, a turn angle dead zone region spreading evenly on both of left and right sides of the neutral position is set on the turn angle axis. The turn angle dead zone region belongs to assist limitation regions in which the steering assist using the assist motor 35 is limited. The turn angle dead zone region is provided to suppress steering assist malfunction based on mismatch such as mismatch between the actual turn angle of the steering wheel 13 and the turn angle detected by the turn angle sensor 26 or mismatch between the actual turn angle of the steering wheel 13 and the turn angle of the wheels even if such mismatch occurs.

Note that the cases where the mismatch between the actual turn angle of the steering wheel 13 and the turn angle of the wheels occurs include, for example, the case where the steering mechanism in which the steering shaft 19 provided on the steering wheel 13 and the turn shaft 31 provided on the turn device 17 are connected to each other via the intermediate shaft portion 27 has a function of adjusting the tilt of the steering shaft 19. In such a case, a change in an isokinetic characteristic due to tilt adjustment of the steering shaft 19 causes the mismatch between the actual turn angle of the steering wheel 13 and the turn angle of the wheel.

In this respect, in the electric power steering device 11 according to the embodiment of the present invention, a CW assist limitation region 97 and a CCW assist limitation region 99 (both regions are described in detail later) in which the steering assist using the assist motor 35 is limited are set in the turn angle-yaw rate matrix of the assist limitation region map 87 illustrated in FIG. 3B. Accordingly, even if the mismatch between the actual turn angle of the steering wheel 13 and the turn angle of the wheels occurs, an effect of maintaining excellent steering feel while suppressing a steering-pull phenomenon can be expected.

Moreover, as illustrated FIG. 3B, a turnable range spreading evenly on both of left and right sides of the neutral position is set on the turn angle axis. The turnable range means a range that is defined by a CW turn angle critical threshold located in the CW direction of the steering wheel 13 and a CCW turn angle critical threshold located in the CCW direction and in which the steering wheel 13 can be turned.

In the turn angle-yaw rate matrix of the assist limitation region map 87 illustrated in FIG. 3B, a norm yaw rate characteristic line graph that is used as a reference illustrates such a characteristic that the yaw rate linearly increases with an increase in the turn angle while passing the original point 0, at reference vehicle speed set in advance.

Note that, in the embodiment, as illustrated in FIG. 3B, the norm yaw rate characteristic line graph is shifted along the yaw rate axis depending on the vehicle speed. Specifically, the norm yaw rate characteristic line graph is shifted along the yaw rate axis in the CW direction when the vehicle speed is higher than the reference vehicle speed, and is shifted along the yaw rate axis in the CCW direction when the vehicle speed is lower than the reference vehicle speed.

As illustrated in FIG. 3B, the moving range of the norm yaw rate characteristic line graph is defined by a norm yaw rate shiftable range. The norm yaw rate shiftable range is set to spread evenly on both of upper and lower sides of the norm yaw rate characteristic line graph at the reference vehicle speed while maintaining the tilt of the norm yaw rate characteristic line graph at the reference vehicle speed.

As illustrated in FIG. 3B, the CW assist limitation region 97 in which the steering assist using the assist motor 35 is limited is set in the assist limitation region map 87 illustrated in FIG. 3B. The CW assist limitation region 97 spreads on the CW side of a norm yaw rate characteristic line graph 101 located in a CW direction part (part on the higher vehicle speed side of the reference vehicle speed) of the norm yaw rate shiftable range, with the norm yaw rate characteristic line graph 101 being the lower limit.

The CW assist limitation region 97 is set to be surrounded also by: a CCW turn angle dead zone region defining line graph 103 that is a line graph orthogonal to the turn angle axis and extends parallel to the yaw-rate axis while passing a turn angle dead zone threshold on the CCW direction side defining the turn angle dead zone region; and a CW turnable range defining line graph 105 that extends parallel to the yaw rate axis while passing the CW turn angle critical threshold.

Moreover, the upper limit of the CW assist limitation region 97 on the CW side is defined by a CW yaw rate defining line graph (not illustrated) that is a line graph orthogonal to the yaw rate axis and extends parallel to the turn angle axis while passing a CW yaw rate critical threshold located in the CW direction.

The CW assist limitation region 97 is provided for purposes such as suppressing the steering-pull phenomenon by limiting the steering assist using the assist motor 35 when the actual yaw rate YRac is outside the norm yaw rate shiftable range, on the CW side thereof along the yaw rate axis.

Meanwhile, as illustrated in FIG. 3B, the CCW assist limitation region 99 in which the steering assist using the assist motor 35 is limited is set in the assist limitation region map 87 illustrated in FIG. 3B. The CCW assist limitation region 99 spreads on the CCW side of a norm yaw rate characteristic line graph 111 located in a CCW direction part (part on the lower vehicle speed side of the reference vehicle speed) of the norm yaw rate shiftable range, with the norm yaw rate characteristic line graph 111 being the upper limit.

The CCW assist limitation region 99 is set to be surrounded also by: a CW turn angle dead zone region defining line graph 113 that is a line graph orthogonal to the turn angle axis and extends parallel to the yaw-rate axis while passing a turn angle dead zone threshold on the CW direction side defining the turn angle dead zone region; and a CCW turnable range defining line graph 115 that extends parallel to the yaw rate axis while passing the CCW turn angle critical threshold.

Moreover, the lower limit of the CCW assist limitation region 99 on the CCW side is defined by a CCW yaw rate defining line graph (not illustrated) that is a line graph orthogonal to the yaw rate axis and extends parallel to the turn angle axis while passing a CCW yaw rate critical threshold located in the CCW direction.

The CCW assist limitation region 99 is provided for purposes such as suppressing the steering-pull phenomenon by limiting the steering assist using the assist motor 35 when the actual yaw rate YRac is outside the norm yaw rate shiftable range, on the CCW side thereof along the yaw rate axis.

The assist limitation determination unit 85 refers to the assist limitation region map 87 and determines whether a specific point (turn angle-yaw rate specific point) based on the information on the turn angle detected by the turn angle sensor 26 and information on the norm yaw rate YRnm based on the norm yaw rate gain is included in the assist limitation regions 97 and 99. Note that the information on the norm yaw rate YRnm based on the norm yaw rate gain may be obtained by multiplying the norm yaw rate gain by the turn angle.

The determination result of the assist limitation determination unit 85 is sent to the steering assist control gain calculation unit 89 as assist limitation region including/not-including information. The assist limitation region including/not-including information is basically information on whether the steering assist using the assist motor 35 is to be limited or not. Contents of "limiting the steering assist" are to be described later in detail.

The steering assist control gain calculation unit 89 includes the second gain map 91 illustrated in FIG. 3C. As illustrated in FIG. 3C, the second gain map 91 describes relationship characteristic information of a steering assist control gain corresponding to a change in yaw deviation. The yaw deviation means the deviation YRdd of the actual yaw rate YRac from the norm yaw rate YRnm set based on the traveling state of the vehicle. Moreover, the steering assist control gain means a coefficient used when a value of a steering assist target current is corrected from the viewpoint of suppressing the steering-pull phenomenon of the vehicle.

The relationship characteristic information illustrated in FIG. 3C includes a first yaw deviation region in which the value of the steering assist control gain corresponding to the change in yaw deviation takes a predetermined value G1 and a second yaw deviation region in which the value of the steering assist control gain linearly gradually decreases with an increase in the yaw deviation.

The steering assist control gain calculation unit 89 refers to the second gain map 91 and converts the yaw deviation to the steering assist control gain.

The steering assist control gain obtained by the norm yaw rate gain calculation unit 81 is sent to the multiplication unit 93.

The norm yaw rate YRnm set based on the traveling state of the vehicle may be calculated by using, for example, the turn angle information detected by the turn angle sensor 26 and the vehicle speed information detected by the vehicle speed sensor 53. Moreover, the information on the norm yaw rate YRnm based on the norm yaw rate gain may be obtained from the assist limitation determination unit 85 and used, as the norm yaw rate, the obtained information on the norm yaw rate YRnm.

For example, the actual yaw rate information detected by the yaw rate sensor 55 may be used as the actual yaw rate YRac.

The multiplication unit 93 multiples the separately-obtained value of the steering assist target current by the steering assist control gain obtained by the steering assist control gain calculation unit 89 and thereby outputs the value of the steering assist control current corrected from the viewpoint of suppressing the steering-pull phenomenon of the vehicle.

[Operations of EPS Control Device 51]

Next, operations of the EPS control device 51 are described with reference to FIGS. 2 and 3A to 3C as necessary.

The norm yaw rate gain calculation unit 81 illustrated in FIG. 2 refers to the first gain map 83 illustrated in FIG. 3A and converts the vehicle speed detected by the vehicle speed sensor 53 to the yaw rate gain.

The yaw rate gain obtained by the norm yaw rate gain calculation unit 81 is sent to the assist limitation determination unit 85 as the norm yaw rate gain.

The assist limitation determination unit 85 illustrated in FIG. 2 refers to the assist limitation region map 87 illustrated in FIG. 3B and determines whether the specific point (turn angle-yaw rate specific point) based on the information on the turn angle detected by the turn angle sensor 26 and the information on the norm yaw rate YRnm based on the norm yaw rate gain is included in the assist limitation regions 97 and 99. The information on the norm yaw rate YRnm based on the norm yaw rate gain may be obtained by multiplying the norm yaw rate gain by the turn angle.

The determination result of the assist limitation determination unit 85 is sent to the steering assist control gain calculation unit 89 as the assist limitation region including/not-including information.

The steering assist control gain calculation unit 89 illustrated in FIG. 2 refers to the second gain map 91 illustrated in FIG. 3C and converts the yaw deviation to the steering assist control gain. Note that the yaw deviation is set based on the deviation (difference) between the actual yaw rate YRac and the norm yaw rate YRnm set based on the traveling state of the vehicle.

The steering assist control gain obtained by the norm yaw rate gain calculation unit 81 is sent to the multiplication unit 93.

The multiplication unit 93 illustrated in FIG. 2 multiplies the separately-obtained value of the steering assist target current by the steering assist control gain obtained by the steering assist control gain calculation unit 89 and thereby outputs the value of the steering assist control current corrected from the viewpoint of suppressing the steering-pull phenomenon of the vehicle.

The EPS control device 51 performs control such that the actual value of the current flowing in the assist motor 35 follows the value of the steering assist control current corrected from the viewpoint of suppressing the steering-pull phenomenon of the vehicle. The EPS control device 51 can thereby appropriately and timely assist the steering torque required when the driver steers the steering wheel 13.

[Operations and Effects Provided by Electric Power Steering Device 11]

Next, operations and effects provided by the electric power steering device 11 according to the present invention are described with reference to FIG. 1.

The electric power steering device 11 based on a first aspect includes the information obtaining unit 71 that obtains information on the steering torque acting on the steering wheel (steering member) 13 of the vehicle and the steering assist control unit (control unit) 75 that performs the steering assist control using the assist motor 35 based on the information on the steering torque.

In the electric power steering device 11 based on the first aspect, the information obtaining unit 71 further obtains the information on the speed of the vehicle, the turn angle of the steering wheel 13, and the actual yaw rate YRac. Moreover, the electric power steering device 11 further includes the setting unit 73 that sets the steering assist control amount relating to the assist motor 35 based on the deviation YRdd of the actual yaw rate YRac from the norm yaw rate YRnm set based on the traveling state of the vehicle. For example, the steering assist control current can be preferably applied as the steering assist control amount relating to the assist motor 35.

The steering assist control unit 75 performs the steering assist control based on the set steering assist control amount.

In the electric power steering device 11 based on the first aspect, the setting unit 73 sets the steering assist control amount relating to the assist motor 35 based on the deviation YRdd of the actual yaw rate YRac from the norm yaw rate YRnm set based on the traveling state of the vehicle. For example, the setting unit 73 sets the steering assist control amount such that the greater the deviation YRdd of the actual yaw rate YRac from the norm yaw rate YRnm set based on the traveling state of the vehicle is, the more the steering assist control amount is reduced. The steering assist control unit 75 performs the steering assist control based on the set steering assist control amount.

A traveling situation in which the deviation YRdd of the actual yaw rate YRac from the norm yaw rate YRnm set based on the traveling state of the vehicle is great can be assumed to be, for example, a traveling situation in which sports driving is performed in a circuit or the like (for example, the deceleration in the front-rear direction exceeds a predetermined deceleration threshold). In such a traveling situation, excellent steering feel can be maintained while suppressing the steering-pull phenomenon by reducing the steering assist control amount from a specified amount.

According to the electric power steering device 11 based on the first aspect, since the setting unit 73 sets the steering assist control amount relating to the assist motor 35 based on the deviation YRdd of the actual yaw rate YRac from the norm yaw rate YRnm set based on the traveling state of the vehicle and the steering assist control unit 75 performs the steering assist control based on the set steering assist control amount, it is possible to maintain excellent steering feel while suppressing the steering-pull phenomenon also in an initial state of steering-pull in which the steering torque starts to increase when the yaw rate is near zero.

Moreover, the electric power steering device 11 based on a second aspect is the electric power steering device 11 based on the first aspect in which the setting unit 73 sets the steering assist control amount such that the greater the deviation YRdd of the actual yaw rate YRac from the norm yaw rate YRnm is, the more the steering assist control amount is reduced.

According to the electric power steering device 11 based on the second aspect, since the setting unit 73 sets the steering assist control amount such that the greater the deviation YRdd of the actual yaw rate YRac from the norm yaw rate YRnm is, the more the steering assist control amount is reduced, it is possible to maintain excellent steering feel while suppressing the steering-pull phenomenon also in the initial state of steering-pull in which the steering torque starts to increase when the yaw rate is near zero, as in the electric power steering device 11 based on the first aspect.

Moreover, the electric power steering device 11 based on a third aspect is the electric power steering device 11 based on the second aspect in which the setting unit 73 sets the steering assist control amount such that the greater the deviation YRdd of the actual yaw rate YRac from the norm yaw rate YRnm is, the more the steering assist control amount is reduced, when the deceleration of the vehicle exceeds the predetermined deceleration threshold. When the deceleration of the vehicle exceeds the predetermined deceleration threshold, there is a high probability that the deviation YRdd of the actual yaw rate YRac from the norm yaw rate YRnm increases with a nosedive phenomenon of the vehicle.

According to the electric power steering device 11 based on the third aspect, the setting unit 73 sets the steering assist control amount such that the greater the deviation YRdd of the actual yaw rate YRac from the norm yaw rate YRnm is, the more the steering assist control amount is reduced, when the deceleration of the vehicle exceeds the predetermined deceleration threshold. Accordingly, the control of reducing the steering assist control amount can be performed more appropriately and timely than that in the electric power steering device 11 based on the second aspect. As a result, it is possible to further improve the effect of maintaining excellent steering feel while suppressing the steering-pull phenomenon.

Moreover, the electric power steering device 11 based on a fourth aspect is the electric power steering device 11 based on the second or third aspect in which the setting unit 73 sets the steering assist control amount such that the greater the deviation YRdd of the actual yaw rate YRac from the norm yaw rate YRnm is, the more the steering assist control amount is reduced, when a slip degree of the wheel is equal to or less than a predetermined slip degree threshold. In short, the case where the slip degree of the wheel exceeds the predetermined slip degree threshold (for example, the case where the vehicle is traveling on a low friction constant road) is excluded from the target of the reduction of the steering assist control amount.

According to the electric power steering device 11 based on the fourth aspect, since the case where the slip degree of the wheel exceeds the predetermined slip degree threshold (for example, the case where the vehicle is traveling on a low friction constant road) is excluded from the target of the reduction of the steering assist control amount, the control of reducing the steering assist control amount can be performed more appropriately and timely than that in the electric power steering device 11 based on the second or third aspect. As a result, it is possible to further improve the effect of maintaining excellent steering feel while suppressing the steering-pull phenomenon.

Moreover, the electric power steering device 11 based on a fifth aspect is the electric power steering device 11 based on any one of the second to fourth aspects in which the setting unit 73 sets the steering assist control amount such that the greater the deviation YRdd of the actual yaw rate YRac from the norm yaw rate YRnm is, the more the steering assist control amount is reduced, when the turn angle of the steering wheel 13 is equal to or less than a predetermined turn angle threshold with the neutral position being the reference. In short, the case where the turn angle of the steering wheel 13 exceeds the predetermined turn angle threshold with the neutral position being the reference is excluded from the target of the reduction of the steering assist control amount.

In this description, the case where the turn angle of the steering wheel 13 exceeds the predetermined turn angle threshold with the neutral position being the reference is assumed to be the case where the turn angle of the steering wheel 13 is outside the turn angle dead zone region illustrated in FIG. 3B. When the steering assist control with the reduced steering assist control amount is performed in such a case, this control may hinder maintaining of excellent steering feel while suppressing the steering-pull phenomenon.

According to the electric power steering device 11 based on the fifth aspect, since the case where the turn angle of the steering wheel 13 exceeds the predetermined turn angle threshold with the neutral position being the reference (for example, the case where the turn angle of the steering wheel 13 is outside the turn angle dead zone region illustrated in FIG. 3B) is excluded from the target of the reduction of the steering assist control amount, the control of reducing the steering assist control amount can be performed more appropriately and timely than that in the electric power steering device 11 based on any one of the second to fourth aspects. As a result, it is possible to greatly improve the effect of maintaining excellent steering feel while suppressing the steering-pull phenomenon.

Moreover, if the steering-pull phenomenon occurs in the vehicle and the driver steers the steering wheel across the neutral position to perform reverse steering (reverse steering wheel state) (provided that the turn angle is equal to or less than the turn angle threshold), excessive steering assist is suppressed by the control of reducing the steering assist control amount. Accordingly, it is possible to achieve excellent steering feel without giving the driver feeling of strangeness in steering.

Moreover, the electric power steering device 11 based on the sixth aspect is the electric power steering device 11 based on one of the first to fifth aspects that may employ a configuration in which the norm yaw rate YRnm is changed depending on the speed of the vehicle.

In this case, changing the norm yaw rate YRnm depending on the speed of the vehicle is assumed to be, for example, a mode in which the norm yaw rate characteristic line graph is shifted along the yaw rate axis depending on the vehicle speed as illustrated in FIG. 3B. Maintaining the characteristic of the norm yaw rate constant irrespective of the vehicle speed causes the deviation YRdd of the actual yaw rate YRac from the norm yaw rate YRnm to be relatively large. This may hinder maintaining of excellent steering feel while suppressing the steering-pull phenomenon.

According to the electric power steering device 11 based on the sixth aspect, since the norm yaw rate YRnm is changed depending on the speed of the vehicle, the control of reducing the steering assist control amount can be performed more appropriately and timely than that in the electric power steering device 11 based on any one of the first to fifth aspects. As a result, it is possible to greatly improve the effect of maintaining excellent steering feel while suppressing the steering-pull phenomenon.

Other Embodiments

The multiple embodiments described above illustrate examples of implementations of the present invention. Accordingly, it should not be interpreted that the technical scope of the present invention is limited by these embodiments. This is because the present invention can be carried out in various modes without departing from the spirit or the main characteristics of the present invention.

For example, although the example in which the steering torque is detected by using the magnetostrictive steering torque sensor 25 is described in the description of the electric power steering device 11 according to the embodiment of the present invention, the present invention is not limited to this example. A steering torque sensor of any type may be employed as the steering torque sensor 25.

Moreover, although the example of the mode in which the norm yaw rate characteristic line graph is shifted along the yaw rate axis depending on the vehicle speed as illustrated in FIG. 3B is described in the description of the electric power steering device 11 according to the embodiment of the present invention, the present invention is not limited to this example. A mode in which the tilt of the norm yaw rate characteristic line graph is changed depending on the vehicle speed (with the original point 0 being the center) may be employed.

Moreover, although the example of the mode in which the setting unit 73 sets the steering assist control amount such that the greater the deviation YRdd of the actual yaw rate YRac from the norm yaw rate YRnm is, the more the steering assist control amount is reduced is described in the description of the electric power steering device 11 according to the embodiment of the present invention, the present invention is not limited to this example.

A mode in which the setting unit 73 reduces and sets the steering assist control amount to a predetermined value when the deviation YRdd of the actual yaw rate YRac from the norm yaw rate YRnm exceeds a predetermined deviation threshold may be employed.

Alternatively, a mode in which the setting unit 73 changes a degree of reducing the steering assist control amount depending on the vehicle speed and the steering torque may be employed.

What is claimed is:

1. An electric power steering device comprising a processor and a drive control circuit configured to control an assist motor, wherein
    the processor
        obtains information on a steering torque acting on a steering member of a vehicle,
        obtains information on speed of the vehicle, a turn angle of the steering member, and an actual yaw rate,
        obtains information on deceleration of the vehicle, and
        relating to the assist motor based on a deviation of the actual yaw rate from a norm yaw rate set based on a traveling state of the vehicle, and
        sets the steering assist control amount such that the greater the deviation of the actual yaw rate from the norm yaw rate is, the more the steering assist control amount is reduced, when the deceleration of the vehicle exceeds a predetermined deceleration threshold, and
    the drive control circuit performs steering assist control by controlling the assist motor based on the information on the steering torque and the set steering assist control amount.

2. The electric power steering device according to claim 1, wherein the norm yaw rate is changed depending on the speed of the vehicle.

3. The electric power steering device comprising a processor and a drive control circuit configured to control an assist motor, wherein
    the processor
        obtains information on a steering torque acting on a steering member of a vehicle,
        obtains information on speed of the vehicle, a turn angle of the steering member, and an actual yaw rate,
        obtains information on a slip degree of a wheel included in the vehicle,
        sets a steering assist control amount relating to the assist motor based on a deviation of the actual yaw rate from a norm yaw rate set based on a traveling state of the vehicle, and
        sets the steering assist control amount such that the greater the deviation of the actual yaw rate from the norm yaw rate is, the more the steering assist control amount is reduced, when the slip degree of the wheel is equal to or less than a predetermined slip degree threshold, and
    the drive control circuit performs steering assist control by controlling the assist motor based on the information on the steering torque and the set steering assist control amount.

4. The electric power steering device according to claim 3, wherein the norm yaw rate is changed depending on the speed of the vehicle.

5. An electric power steering device, wherein comprising a processor and a drive control circuit configured to control an assist motor, wherein
    the processor
        obtains information on a steering torque acting on a steering member of a vehicle,
        obtains information on speed of the vehicle, a turn angle of the steering member, and an actual yaw rate,
        sets a steering assist control amount relating to the assist motor based on a deviation of the actual yaw rate from a norm yaw rate set based on a traveling state of the vehicle,
        sets the steering assist control amount such that the greater the deviation of the actual yaw rate from the norm yaw rate is, the more the steering assist control amount is reduced, when the turn angle of the steering member is equal to or less than a predetermined turn angle threshold with a neutral position being a reference, and
    the drive control circuit performs steering assist control by controlling the assist motor based on the information on the steering torque and the set steering assist control amount.

6. The electric power steering device according to claim 5, wherein the norm yaw rate is changed depending on the speed of the vehicle.

* * * * *